(12) United States Patent
Carella et al.

(10) Patent No.: US 10,219,654 B2
(45) Date of Patent: Mar. 5, 2019

(54) COMBINED HEATING AND STIRRING ARRANGEMENT METHOD FOR HEATING FOOD AND HEATING STIRRER

(71) Applicant: Electrolux Appliances Aktiebolag, Stockholm (SE)

(72) Inventors: Stefano Carella, Rothenburg ob der Tauber (DE); Michael Herzog, Rothenburg ob der Tauber (DE); Alex Viroli, Forli (IT)

(73) Assignee: Electrolux Appliances Aktiebolag, Stockholm (SE)

( * ) Notice: Subject to any disclaimer, the term of this patent is extended or adjusted under 35 U.S.C. 154(b) by 75 days.

(21) Appl. No.: 15/029,963

(22) PCT Filed: Dec. 9, 2014

(86) PCT No.: PCT/EP2014/077008
§ 371 (c)(1),
(2) Date: Apr. 15, 2016

(87) PCT Pub. No.: WO2015/091097
PCT Pub. Date: Jun. 25, 2015

(65) Prior Publication Data
US 2016/0235251 A1    Aug. 18, 2016

(30) Foreign Application Priority Data
Dec. 20, 2013    (EP) .................................... 13198714

(51) Int. Cl.
*B01F 13/08*    (2006.01)
*A47J 43/046*    (2006.01)
(Continued)

(52) U.S. Cl.
CPC ............. *A47J 43/0465* (2013.01); *A23L 5/15* (2016.08); *A47J 27/004* (2013.01);
(Continued)

(58) Field of Classification Search
CPC ......................... B01F 13/0818; B01F 13/0827
(Continued)

(56) References Cited

U.S. PATENT DOCUMENTS 2,350,534 A * 6/1944 Rosinger ............. A47J 43/0465
                                                          15/220.2
4,991,973 A * 2/1991 Maaz .................. B01F 13/0818
                                                          177/212
(Continued)

FOREIGN PATENT DOCUMENTS

DE            917996 C  *  9/1954 ............ A47J 43/046
DE            917996 C     9/1954

OTHER PUBLICATIONS

Translation of patent reference DE917996 dated Oct. 4, 2017, EPO site, 2 pages.
(Continued)

*Primary Examiner* — Reginald Alexander
(74) *Attorney, Agent, or Firm* — Pearne & Gordon LLP

(57) ABSTRACT

The invention discloses a facilitated cooking method which allows it to stir and heat food on the basis of magnetic fields preferably respectively by induction cooking. A magnetic stirrer heater (110) is preferably propelled by coils (125, 128) and heated by an induction coil (110). A corresponding arrangement and a magnetic stirrer heater are disclosed as well. The combined heating and stirring arrangement can be used for automated cooking by carrying out the stirring and heating of the food according to a time schedule.

12 Claims, 6 Drawing Sheets

(51) Int. Cl.
*A47J 27/00* (2006.01)
*A23L 5/10* (2016.01)

(52) U.S. Cl.
CPC ...... *B01F 13/0818* (2013.01); *B01F 13/0827* (2013.01); *A23V 2002/00* (2013.01)

(58) Field of Classification Search
USPC .................................. 99/348; 366/273, 274
See application file for complete search history.

(56) References Cited

U.S. PATENT DOCUMENTS

| | | | |
|---|---|---|---|
| 5,549,382 A * | 8/1996 | Correia, II | B01F 11/0082 126/374.1 |
| 5,834,739 A | 11/1998 | Lockwood | |
| 7,699,979 B2 * | 4/2010 | Li | B82Y 15/00 210/138 |
| 2004/0047232 A1 * | 3/2004 | Terentiev | B01F 7/00908 366/273 |
| 2006/0209628 A1 * | 9/2006 | Jones | B01F 13/0818 366/273 |
| 2010/0046323 A1 * | 2/2010 | Tien | B01F 13/0818 366/274 |
| 2011/0263464 A1 * | 10/2011 | De Bruyker | B01F 13/0071 506/40 |

OTHER PUBLICATIONS

International Search Report issued in PCT/EP2014/077008 dated Mar. 23, 2015, 2 pages.

* cited by examiner

COMBINED HEATING AND STIRRING ARRANGEMENT METHOD FOR HEATING FOOD AND HEATING STIRRER

Due to more and more obligations in modern times, saving time is becoming more and more important. In today's household environments, this means that the tendency to automate household appliances as much as possible is to be observed. On the other hand, the expectations of potential customers regarding the performance, the design, the energy consumption and the reliability of the devices are rising.

In the field of food preparation in kitchen environments, many people wish to be their own chef and prepare food with various tastes on a sophisticated level. In this area, the preparation of liquid dishes with low viscosity poses a high risk that while they are heated to burn them at the bottom of the cooking vessel. Therefore, in the past, people were required to focus their attention particularly on such meals and to constantly observe the cooking process by stirring the food while heating it. If the cook would not need to observe one dish constantly, he could focus on other related tasks or the preparation of other courses of the meal.

Thus, there is a requirement to facilitate the cooking of viscose substances and to relieve a cook from the duty of constantly stirring such dishes as sauces, puddings, risotto or the like.

Further, there is also a tendency to reduce the complexity of household appliances, such as kitchen hobs, and to minimize the number of components that are used in order to speed up the manufacturing process and reduce storage and transport complexity.

The German patent publication document DE 10 2006 052475 A1 discloses an automatic stirring device in a kitchen hob. A magnetic stirring element is propelled by a magnetic engine integrated in the cooking plate. The cooking surface material of the hob is required to have thermal conductivity in order to enable heat transfer from a heating device into a cooking vessel, which contains the magnetic stirrer. As heat sources, gas combustion and electrical energy as well as induction heating are disclosed as potential alternatives.

However, no teaching is given as to how the various combinations of heat sources with a magnetic stirrer are to be operated in practical use.

The invention is based on the problem to provide a reliable stirrer in the presence of induction heating, especially for a kitchen hob.

The applicant has conducted experiments with magnetic stirrers and induction heating and has found that it is difficult to be provided in the presence of ferromagnetic cooking vessels.

Further, it is also found advantageous to operate induction hobs with non-thermally conducting cooking top surfaces, as a thermally conducting cooking surface draws thermal energy out of the cooking vessel, which is focused there by induction heating, and thus costs energy and time rendering the cooking process inefficient.

Advantageously, the combined heating and stirring arrangement according to the present invention combines a stirring device having magnetic and electrical properties as well as a propelling mechanism to magnetically propel the stirring device and a heating mechanism to heat the stirring device. In this manner, a ferromagnetic cooking vessel can be omitted while at the same time presenting a simple heating and stirring arrangement that allows sophisticated control over the cooking process.

Beneficially, according to a further development of an embodiment of an arrangement according to the present invention, it further comprises a non-conductive/non-ferromagnetic cooking vessel, because such a cooking vessel does not impede the magnetic waves on their way to a stirring device and allows a controllable and homogeneous distribution of the magnetic field in any desired manner inside of the cooking vessel.

Beneficially, according to a further development of an embodiment of the arrangement according to the present invention, the heating mechanism is based on magnetic induction, as in this manner the food can be heated in an energy-efficient and highly controllable manner, while at the same time promoting the focusing of the heating energy inside of the cooking vessel and allowing to keep it there. Thus, only the food is heated and the electrical energy for cooking is optimally used.

In an advantageous manner, according to a further development of an embodiment of the arrangement according to the present invention, the propelling mechanism is based on magnetic attraction and repulsion. Such a solution provides a highly controllable stirring of stirring devices in various shapes in a beneficial manner.

Favorably, according to a further development of an embodiment of the arrangement according to the present invention, it comprises a guide for the magnetic field lines, thus focusing the magnetic energy leading to a higher efficiency of the magnetic propelling mechanism.

Beneficially, according to a further development of an embodiment of the arrangement of the present invention, the guide of the magnetic field lines is made of ferrite material, which is highly suitable for guiding magnetic field lines and thus leads to a high efficiency of the magnetic propelling mechanism.

Advantageously, according to a further development of an embodiment of the arrangement according to the present invention, a plurality of magnetic coils are provided adapted to be energized by a time schedule in sequence. In this manner, efficiently, a propelling mechanism can be provided without moving parts that takes any actual position of the stirring device into account and at the same time repels it and attracts it with an appropriately controlled coil arrangement. In this manner, the stirring speed as well as the stirring power/moment can be exactly controlled.

Advantageously, according to a further development of an embodiment of the arrangement according to the present invention, a number of magnetic poles is adapted to the number of excitation phases of the electrical current. In this manner, the magnetic propelling mechanism can be optimally adapted to the electrical supply situation, be it either present in one phase or three phases, as commonly available.

Beneficially, according to a further development of an embodiment of an arrangement according to the present invention, the number of magnetic coils is adapted to the number of excitation phases because in such a manner, the magnetic propelling mechanism can be efficiently operated in the presence of different electrical supply situations.

Advantageously, in a further development of an arrangement according to the present invention, the heating mechanism and the propelling mechanism are combined. In this manner, fewer parts are required to build the arrangement. Thus, the reliability of the arrangement can be improved and a manufacturing of the arrangement can be simplified.

Advantageously, in a further development of an arrangement of an embodiment according to the present invention, the stirring device can be adapted to a cooking situation and provided in different shapes, which also allows further control of the rotation speed and the cooking result in the presence of different food dishes and electrical supply situations.

Advantageously, according to a further development of an embodiment of the arrangement according to the present invention, the stirring device is shaped to promote turbulence when moved inside the substance to be stirred. In this manner, an optimum stirring and heating result can be promoted.

Advantageously, according to the method of the present invention, only one device is needed for heating and stirring a cooking substance. This increases the control possibilities of the cooking process and improves the cooking result.

Advantageously, according to a further development of the method according to the present invention, in a non-conductive/ferromagnetic cooking vessel, cooking and stirring is effected by a magnetic field. Magnetic field- and induction technology is available on a sophisticated level and thus allows a fine tuning of the cooking process in terms of energy use and controllability of the stirring speed as well as the heating capacity.

Advantageously, the stirring device according to the present invention is electrically conductive and has at least two magnetic poles. This facilitates propulsion by a magnetic field as well as heating by an inductive field in an efficient manner in one single component.

Subsequently, the invention will further be described on the basis of examples shown in the drawings, wherein.

Figure 3:
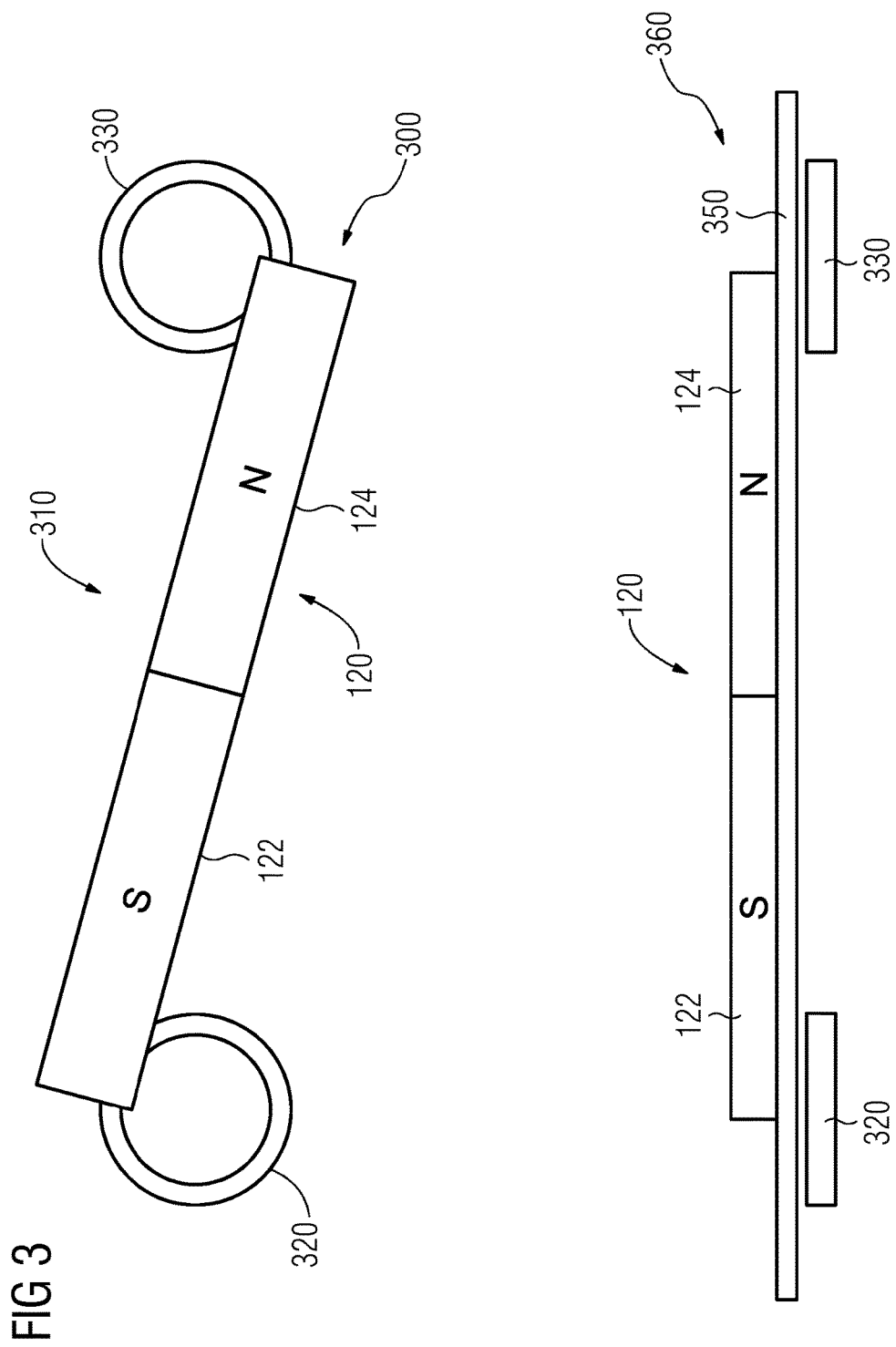
Figure 4:
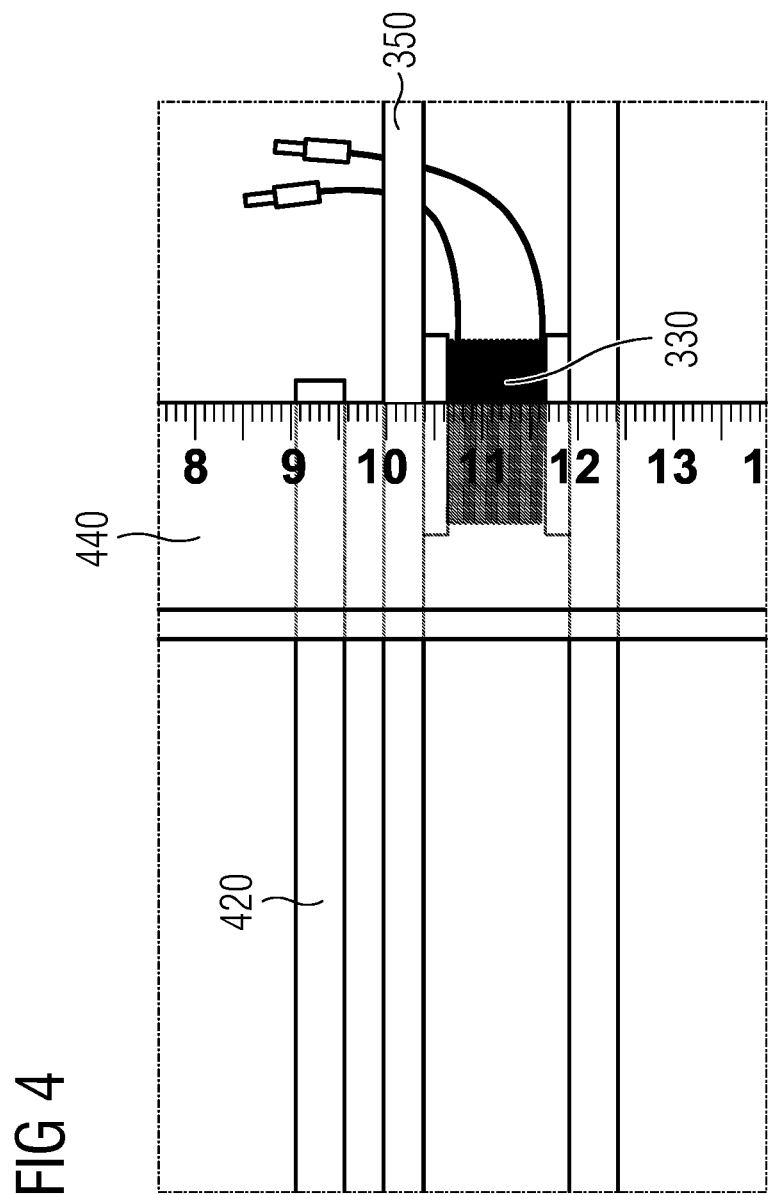
Figure 5:
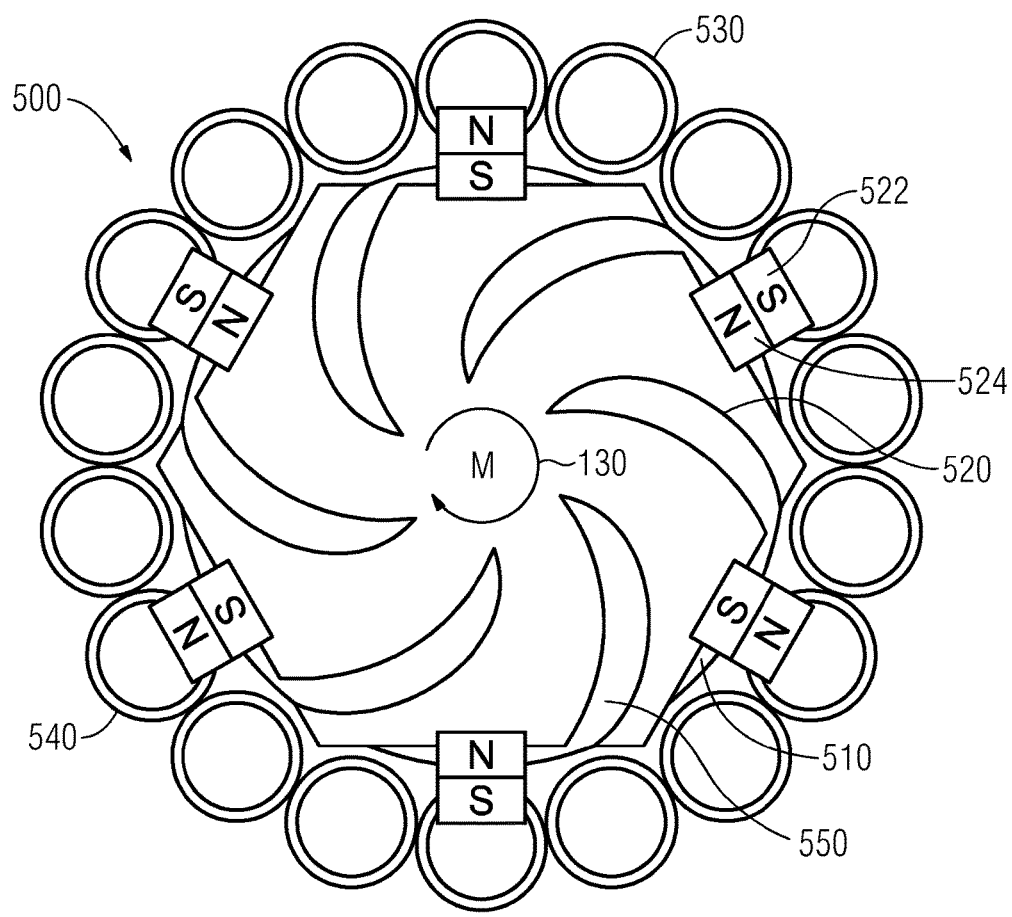
Figure 6:
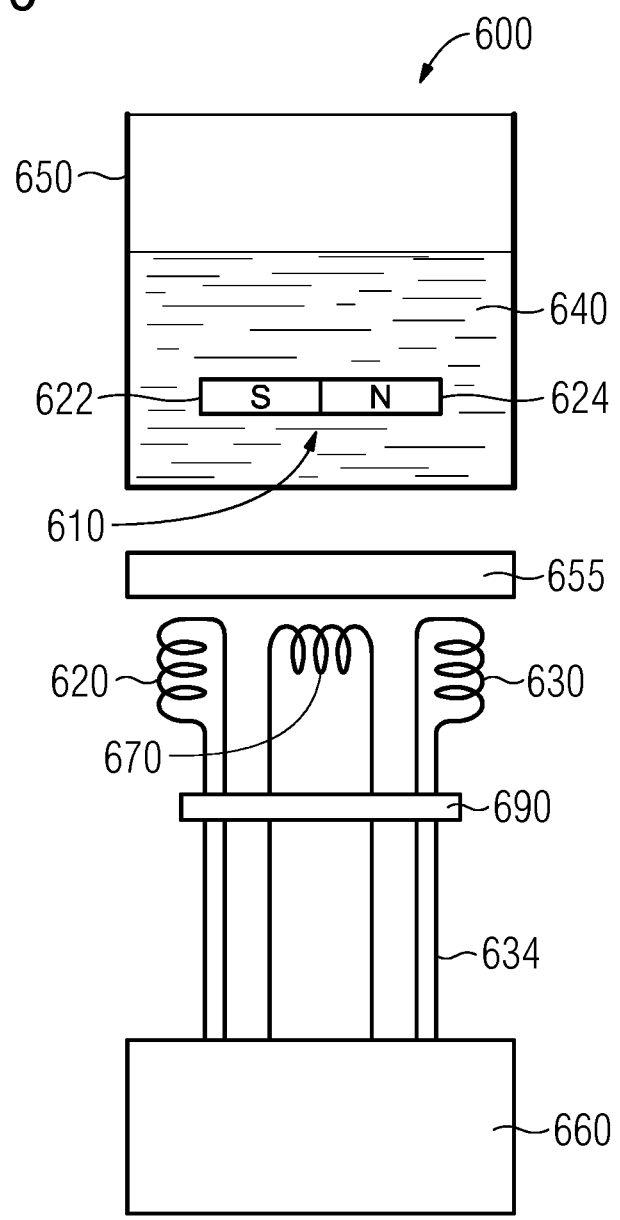

FIG. 3 gives another example of a stirring device in the presence of a non-conducting/non-ferromagnetic cooking vessel;

FIG. 4 shows a practical example of an arrangement with a stirring device and an electromagnetic coil;

FIG. 5 shows an example of an arrangement according to an embodiment of the present invention having a disk-shaped stirring device; and FIG. 6 shows an example of a cooking arrangement according to an embodiment of the present invention.

Figure 1:
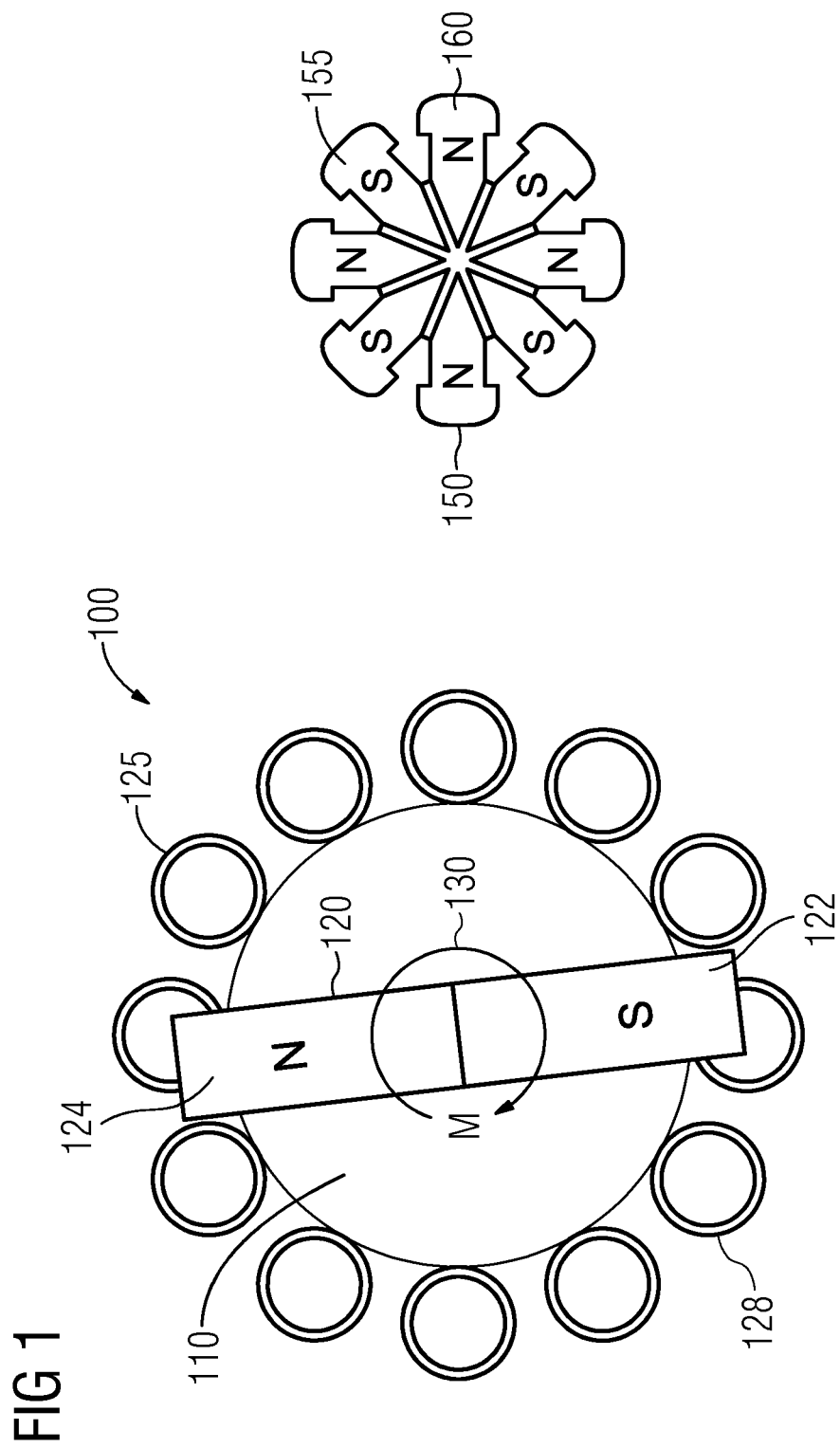
FIG. 1 shows a schematic representation of a combined heating and stirring arrangement.

As FIG. 1 shows, a preferred embodiment of a cooking arrangement 100 according to an embodiment of the present invention comprises a stirring device 120 which consists of a magnet 124 having a north pole and a magnet 122 having a south pole. Also shown are several coils 125 and 128 suitable for the generation of a rotating magnetic field. Further shown is another coil 110 for generating an inductive field that e.g. serves the heating of a stirring device 120. By appropriately switching the coils, e.g. 125 and 128, the stirring device 120 can be propelled in a manner that one coil attracts a pole and another coil rejects a pole of the stirring device. By switching the coils in a rotating manner and in a time schedule, the speed and the force effected by the stirring device 120 can be controlled. The stirring device 150 has plural poles 150 with only north pole 160 and south pole 155 pointed out and marked here. It may be used in the presence of plural excitation phases.

With such a combined heating and stirring device, food may be appropriately heated and stirred and the burning of the food sticking to the bottom of the cooking vessel may be securely prevented. On the other hand, sophisticated control of the rotating speed/-momentum and the heating energy is facilitated, which allows it to use the combined heating and stirring arrangement in combination with automated cooking processes that largely automate the preparation of certain food dishes by controlling heat and temperature and stirring speed over time in the presence of respectively different food substances.

Figure 2:
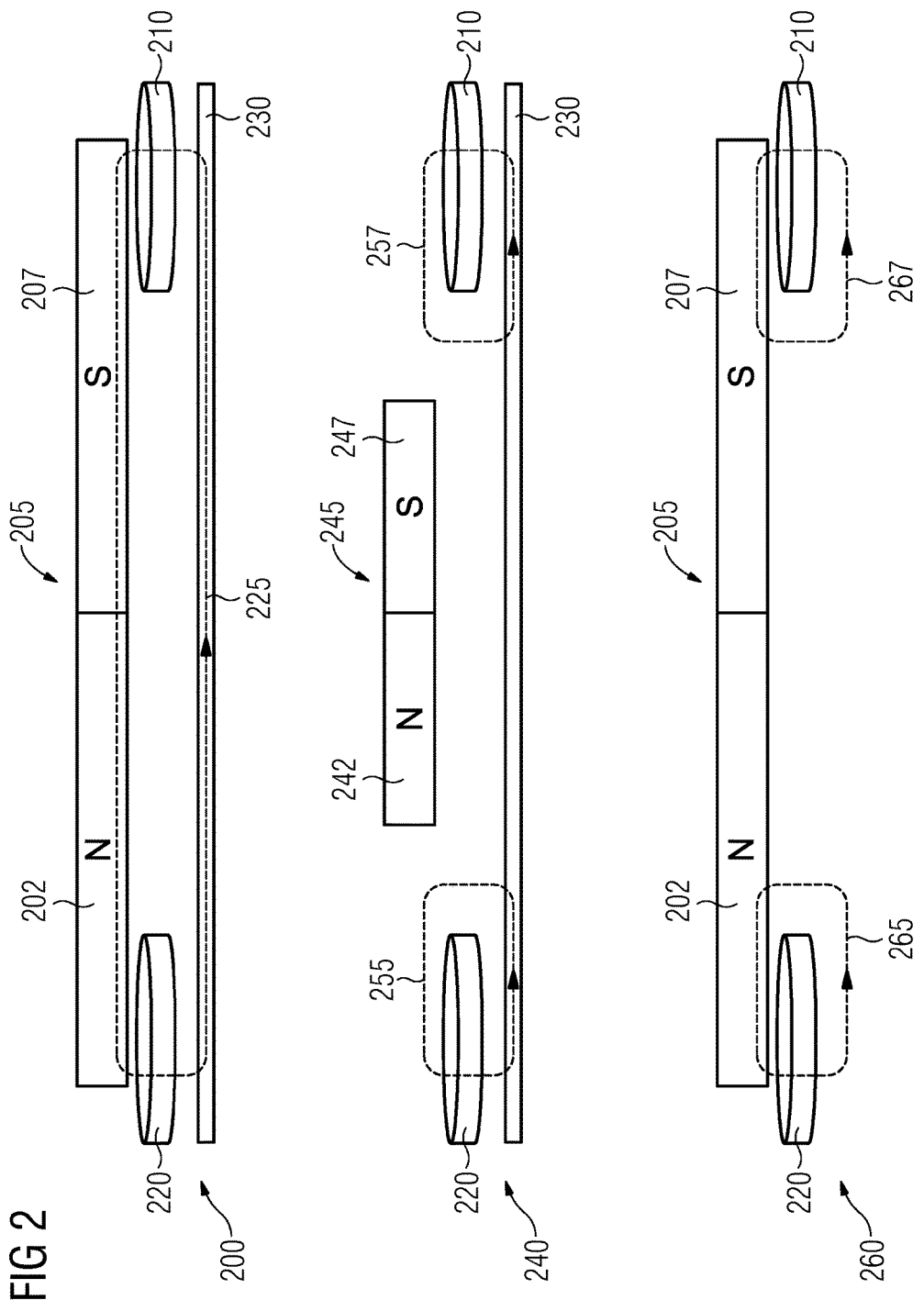
FIG. 2 shows different examples of magnetic configurations of a magnetic propelling mechanism.

As FIG. 2 shows, various magnetic coil arrangements are possible. In an example 200, coils 220, 210 cooperate to propel a stirring device 205 which has a north pole 202 and a south pole 207. In order to guide the magnetic field lines, a ferrite bar 230 is present that guides the magnetic field lines 225 throughout the coil and throughout the stirring device 205. In this manner, an efficient magnetic propelling can be achieved. As can be also seen, the length of the stirring device plays a role. Once the magnetic field lines do not enter the stirring device, the propelling of it is not possible.

Such an example 240 is for instance given below. Here, a shorter magnetic stirring device 245 is shown that has a magnetic north pole 242 and a magnetic south pole 247. Supposedly, this stirring device 245 should be propelled by a coil 210 cooperating with another coil 220 that are also connected by a ferrite bar 230. Any other configuration of ferrite guide can also be conceived by the person skilled in the art. Here, it can be clearly recognized that the magnetic field lines 255 of the coil 220 and 257 of the coil 210 do not enter the stirring device 245, and thus it cannot be propelled in such an arrangement.

On the other hand, in another example 260, in the absence of a ferrite bar or a ferrite guide 230, the magnetic stirring device 205 of example 200 in a case without ferrite bar shown in this example 260 cannot be properly propelled, as the magnetic flux lines 265 and 267 are not connected and no continuous flux throughout the coils and the stirring device 205 is facilitated.

Subsequently, some rough estimations of the electrical basic principle are given. In order to present a rough estimation of the torsional moment, e.g. a number of assumptions have to be made to provide an easy way for calculating it.

The flux density of a coil with a radius r and negligible length at a distance x on its main axis is:

$$B = \frac{I \cdot \mu}{2} \cdot \frac{r^2}{(r^2 + x^2)^{\frac{3}{2}}} \tag{1}$$

For the further calculation, this formula is approximated is however important in order to understand the attenuation of the magnetic field with increasing distance. In particular, for a rough estimation of an optimum diameter of the field generating coil it can be used because of dB/dr=0 for a known distance x.

An assumption is made e.g. based on the following basis:

A number of coils used is 18. A maximum coil diameter is 0.03 m. The coils contain a ferrite core and have a maximum number of windings of 50. Also a maximum coil current should not exceed 5 A.

In addition to these assumptions for the field generation, e.g. the following assumptions for the field coupling are made:

A minimum distance from a coil to a magnet bar is about 0.01 m, whereas the whole magnetic flux at a distance of 0 m is present at the stirring device, while a stirring device has here two poles with a cross-section of approximately 1 cm$^2$ each.

Based on these assumptions, a total force per pole for one coil can be calculated in order to be able to create a rotation and an attraction in a direction of the vessel bottom.

$$B = \frac{I \cdot n \cdot \mu}{2} \cdot \frac{r^2}{(r^2 + 0^2)^{\frac{3}{2}}} = \quad (2)$$

$$\frac{5A \cdot 50 \cdot 4 \cdot \pi \cdot 10^{-7} \frac{N}{A^2}}{2} \cdot \frac{(0,015 \text{ m})^2}{((0,015 \text{ m})^2)^{\frac{3}{2}}} \approx 10 \cdot 5 \text{ mT}$$

$$F = \frac{A}{\mu} \cdot B^2 \approx \frac{1 \cdot 10^4 \text{ m}^2}{4 \cdot \mu \cdot 10^7 \frac{N}{A^2}} \cdot (1,26 \text{ mT})^2 \approx 8,7 \text{ mN} \quad (3)$$

Based on the force and the following assumptions and simplifications, the whole force is creating the moment, and the stirring device has a length of 20 cm. The moment of two coils at both ends of the stirring device can thus be calculated into $$M = 2 \cdot F \cdot \frac{l}{2} \approx 2 \cdot 8,7 \text{ mN} \cdot \frac{0,2 \text{ m}}{2} \approx 1,75 \text{ mNm} \quad (4)$$

Here it has to be noted that the other coils have only a minor effect on the resulting torsional moment due to the attenuation of the field in dependency of the distance from the coil. Thus, from a theoretical point of view, a rough estimate of the moment can be given.

FIG. 3 shows another example of the combined heating stirring arrangement according to an embodiment of the present invention. Here, a stirring device 310 has a magnetic south pole 122 and a magnetic north pole 124 and is propelled by a coil 330 cooperating with the coil 320. The coils emanate a magnetic field throughout the bottom of a non-conducting/non-ferromagnetic vessel 350.

Although the stirring device 120 rests on the bottom of the vessel, it can be easily conceived that in the presence of a fluid the friction between the bottom of the vessel and the stirring device 120 can be overcome due to the liquid film between the stirring device and the bottom of the cooking vessel 350. On the other hand, the mobility of the stirring device in the cooking vessel can be further improved by providing it with small protrusions in order to minimize the contact surface between the bottom of the cooking vessel and the stirring device 120. Also the stirring device can be equipped with an optimized shape in order to improve its floating capabilities and its stirring capabilities in a sense of creating turbulence in the substance to be heated and stirred.

As FIG. 4 shows, an experimental setup comprises a stirring device 420, a coil 330, the bottom of a cooking vessel 350 and a gauge 440. It can be seen that the coil approximately measures 15 mm in length, whereas the windings are spread over 10 mm over the coil core, whereas the distance between the coil core and the magnetic stirring device is about 5 mm and the thickness of the bottom of the cooking vessel is about 4 mm. It can be conceived that these measurements depend on the size of the coils, the amount of energy needed for heating and the amount of food needed to be heated as well as the moment that needs to be created for stirring the food to be heated and thus are variables.

As FIG. 5 shows, the combined heating stirring arrangement according to another embodiment of the present invention can comprise e.g. 18 magnetic coils 530, 540 and a number of six magnets having a south pole 522 and a north pole 524 arranged outside of a ferromagnetic disk which in this case is equipped with protrusions in the shape of fins, in order to create turbulence in the fluid which is stirred and heated by the combined heating and stirring device. Also shown is that a torsional moment 130 is created by this stirring device. The stirring device according to this embodiment 520 is propelled by activating the magnetic coils 530, 540—only two of these coils are indicated with reference signs, but the person skilled in the art understands that all of the coils are used in the magnetic propelling process—in a timely scheduled manner, one after another depending on the desired speed of the stirring device 120 and a torsional moment that is required to stir the fluid respectively the substance or food to be heated. The magnets 522, 524 are grouped on three axes in pole pairs such that three pole pairs in a distance of respectively 60° are present. More or less pole pairs can be desirable depending on the application case and further experimental cooking results.

Embodiments of the present invention provide different alternatives. The rotating field and the field for heating are e.g. split. The coils used for creating and rotating are e.g. used in parallel to heat up the stirring device. In this case, however, it has to be considered that contradictory requirements are to be satisfied by such an arrangement.

For heating a homogenous magnetic field distribution is desirable, while for propelling the stirring device, a creation of dedicated poles by the coils is preferable.

An exemplary propelling arrangement may consist in 18 coils which correspond to a number of pole pairs of three phase excitations. Six coils may be switched in sequence at a time which leads to three phases.

The coil diameter may be preferably 3 cm. The inner part of the stirring device may consist of a structured piece of ferromagnetic steel. This should be heated up by the inductive field. On the other hand, it should also be able to serve the purpose to conduct the magnetic field from the single poles to each other. Further, it should be beneficially shaped in order to be suitable for stirring food. In this case, an induction coil with a diameter of 14 cm might be used which would lead to a limitation of a maximum power. Generally, by using a greater number of coils, a bigger force can be created. On the other hand, under the different coils that are creating a magnetic field for propelling the stirring device, a ring of ferrites may be favorably provided. Further, it should be considered that all the material constants are also depending on a temperature, so that appropriate material can be selected for a particular cooking case. Such parameters are, for instance, the resistance R and the inductance L.

As FIG. 6 shows, a combined heating stirring arrangement according to an embodiment of the present invention 600 may be implemented in an induction cooking hob. Here, a cooking vessel 650 is shown that contains a stirring device 610 suitable to stir a food substance 640. As described above in a known manner, the stirring device 610 has at least a south pole 622 and a north pole 624. A ferrite element 690 is provided in order to guide the magnetic field lines. Further, the figure shows coils 620 and 630 which are adapted to propel the stirring device 610. Further, a cooking top surface 655 is shown which is preferably non-thermally conducting in order to keep the thermal energy inside of the cooking vessel 650. Furthermore, a coil 670 is shown which serves the purpose of heating the stirring device 610 by means of magnetic induction. In addition, a control 660 is shown, which may be used to control the time sequence of the activation of the coils 620 and 630 as well as the power emanated by the induction coil 670. Beneficially, the control 660 may operate according to an automated cooking program that prepares the food 670 according to a certain recipe meaning, a certain stirring speed and a certain heating according to a time schedule depending on the food and the desired condition of the food after its preparation.

LIST OF REFERENCE NUMERALS 100 combined heating and stirring arrangement;
110 coil for induction heating;
120 stirring device;
124, 122 magnetic north and south pole;
130 torsional moment;
125, 128 magnetic coils;
150 stirring device with plural poles;
155, 150 magnetic south and north pole;
200, 240, 260 different magnetic configurations;
205, 245 stirring device;
202, 207 magnetic north and south pole;
242, 247 magnetic north and south pole;
225, 255, 257,
265, 267 magnetic field lines;
210, 220 magnetic coils;
230 ferrite element;
310 stirring device
320, 330 coils;
300 combined heating stirring arrangement;
350 non-ferrite magnetic non-conducting bottom of a cooking vessel;
420 stirring device
440 gauge;
500 alternative heating and stirring arrangement;
530, 540 magnetic coils;
522, 524 magnetic south and north pole;
510 stirring device;
550 stirring shape;
520 ferromagnetic coil of stirring device;
600 combined heating stirring arrangement;
650 cooking vessel;
640 food;
622, 624 magnetic south and north pole;
610 stirring device;
655 cook top;
620, 630 magnetic coils for propulsion;
670 magnetic coil for induction heating;
690 ferrite element;
660 control;
634 connecting wire.

The invention claimed is:

1. A combined heating and stirring arrangement comprising:
   a stirring device with magnetic and electrical conductive properties for stirring a substance to be heated;
   a propelling mechanism for propelling the stirring device based on its magnetic properties;
   a heating mechanism for heating the stirring device based on its electrical conductive properties, wherein the stirring device is configured to be rotated to stir the substance and heated at the same time to heat the substance; and
   a ferrite bar for influencing magnetic field lines through the propelling mechanism and through the stirring device.

2. The arrangement according to claim 1, further comprising a non-conductive/ferromagnetic vessel to contain the substance.

3. The arrangement according to claim 1, wherein the heating mechanism is based on magnetic induction.

4. The arrangement according to claim 1, wherein the propelling mechanism is based on magnetic attraction/repulsion.

5. The arrangement according to claim 4, wherein a plurality of magnetic coils are provided adapted to be energized by a timed schedule in sequence.

6. The arrangement according to claim 4, wherein a number of magnetic poles is adapted to a number of electrical excitation phases.

7. The arrangement according to claim 5, wherein the number of magnetic coils is adapted to a number of electrical excitation phases.

8. The arrangement according to claim 1, wherein the heating mechanism and the propelling mechanism are combined.

9. The arrangement according to claim 1, wherein the stirring device is bar-shaped or disk-shaped.

10. The arrangement according to claim 1, wherein the stirring device is adapted to promote turbulence when moved in the substance.

11. A method for stirring and heating food, wherein the food is heated and stirred by the arrangement of claim 1.

12. The method according to claim 11, wherein the food is contained in a non-conductive/non-ferromagnetic cooking vessel and heating as well as stirring are affected by a magnetic field.

* * * * *